United States Patent
Wang

(10) Patent No.: US 10,659,280 B2
(45) Date of Patent: May 19, 2020

(54) VEHICLE-BASED COMMUNICATION METHOD, SYSTEM, AND APPARATUS

(71) Applicant: TENCENT TECHNOLOGY (SHENZHEN) COMPANY LIMITED, Shenzhen (CN)

(72) Inventor: Dafeng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 22 days.

(21) Appl. No.: 16/040,235

(22) Filed: Jul. 19, 2018

(65) Prior Publication Data
US 2018/0324566 A1 Nov. 8, 2018

Related U.S. Application Data

(63) Continuation of application No. PCT/CN2017/080352, filed on Apr. 13, 2017.

(30) Foreign Application Priority Data

Apr. 13, 2016 (CN) .......................... 2016 1 0227510

(51) Int. Cl.
*H04W 4/46* (2018.01)
*H04L 29/08* (2006.01)
(Continued)

(52) U.S. Cl.
CPC ............ *H04L 29/08* (2013.01); *G06K 9/3258* (2013.01); *H04L 67/306* (2013.01); *H04W 4/40* (2018.02);
(Continued)

(58) Field of Classification Search
CPC ........ H04B 1/3822; H04W 4/08; H04W 4/46; H04W 8/186; G06Q 50/01
See application file for complete search history.

(56) References Cited

U.S. PATENT DOCUMENTS

2011/0300840 A1* 12/2011 Basir .................. H04W 4/08
455/416
2015/0312353 A1 10/2015 Chen et al.

FOREIGN PATENT DOCUMENTS

CN 201267003 Y 7/2009
CN 102868970 A 1/2013
(Continued)

OTHER PUBLICATIONS

The World Intellectual Property Organization (WIPO) International Search Report for PCT/CN2017/080352 dated May 27, 2017 5 Pages (including translation).
(Continued)

*Primary Examiner* — Mansour Oveissi
(74) *Attorney, Agent, or Firm* — Anova Law Group, PLLC

(57) ABSTRACT

A vehicle-based communication method is provided. A server receives, from a first communication device of a first vehicle, license plate information of a second vehicle and a device identifier of the first communication device. The server determines a communication account of a second communication device corresponding to the second vehicle according to the license plate information of the second vehicle, and sends the communication account of the second communication device to the first communication device. The first communication device receives the communication account of the second communication device, and communicates with the second communication device according to the communication account of the second communication device.

20 Claims, 7 Drawing Sheets

(51) Int. Cl.
*H04W 4/44* (2018.01)
*H04W 4/40* (2018.01)
*G06K 9/32* (2006.01)
*H04W 76/00* (2018.01)
*H04L 29/12* (2006.01)

(52) U.S. Cl.
CPC .............. *H04W 4/44* (2018.02); *H04W 4/46* (2018.02); *G06K 2209/15* (2013.01); *H04L 61/15* (2013.01); *H04L 67/141* (2013.01); *H04W 76/00* (2013.01)

(56) References Cited

FOREIGN PATENT DOCUMENTS

| | | |
|---|---|---|
| CN | 105430039 A | 3/2016 |
| WO | 2012037166 A2 | 3/2012 |
| WO | 2013026443 A1 | 2/2013 |

OTHER PUBLICATIONS

The European Patent Office (EPO) The Extended European Search Report for 17781911.7 dated Feb. 14, 2019 10 Pages.

\* cited by examiner

VEHICLE-BASED COMMUNICATION METHOD, SYSTEM, AND APPARATUS

RELATED APPLICATION

This application is a continuation application of PCT Patent Application No. PCT/CN2017/080352, filed on Apr. 13, 2017, which claims priority to China Patent Application No. 201610227510.1, filed with the Chinese Patent Office on Apr. 13, 2016 and entitled "VEHICLE-BASED COMMUNICATION METHOD, SYSTEM, AND APPARATUS", which is incorporated herein by reference in its entirety.

FIELD OF THE TECHNOLOGY

The present disclosure relates to the field of intelligent transportation and, in particular, to a vehicle-based communication method, system, and apparatus.

BACKGROUND OF THE DISCLOSURE

With the development of economy, more and more automobiles are driven on roads, and a vehicle owner may need to communicate with another vehicle owner due to various situations, for example, when there is traffic congestion ahead or an object falls off from a vehicle ahead.

In the existing technology, when a vehicle owner of a tailing vehicle needs to communicate with a vehicle owner of a front vehicle, the vehicle owner of the tailing vehicle needs to have contact information the vehicle owner of the front vehicle, or to get the attention of the vehicle owner of the front vehicle using whistling or the like and then communicate with the vehicle owner of the front vehicle face to face.

However, according to the present disclosure, if the vehicle owner of the tailing vehicle does not have the contact information of the vehicle owner of the front vehicle, or the vehicle owner of the tailing vehicle also cannot contact with the vehicle owner of the front vehicle by using other methods above, the vehicle owner of the tailing vehicle cannot communicate with the vehicle owner of the front vehicle.

The disclosed methods and systems are directed to solve one or more problems set forth above and other problems.

SUMMARY

To resolve problems of the existing technology, embodiments of this application provide a vehicle-based communication method, system, and apparatus. The technical solutions are as follows.

According to one aspect of the present disclosure, a vehicle-based communication method applied to a server is provided. The server receives, from a first communication device corresponding to a first vehicle, license plate information of a second vehicle and a device identifier of the first communication device. The server determines a communication account of a second communication device corresponding to the second vehicle according to the license plate information of the second vehicle, and sends the communication account of the second communication device to the first communication device. The first communication device receives the communication account of the second communication device, and communicates with the second communication device according to the communication account of the second communication device.

According to another aspect of the present disclosure, a vehicle-based communication method is provided for a first communication device corresponding to a first vehicle. The method includes obtaining license plate information of a second vehicle and a device identifier of the first communication device, and sending the license plate information of the second vehicle and the device identifier of the first communication device to a server connected to the first communication device. The server is configured to: determine a communication account of a second communication device corresponding to the second vehicle according to the license plate information of the second vehicle, and send the communication account to the first communication device. The method also includes receiving the communication account, and communicating with the second communication device according to the communication account.

According to another aspect of the present disclosure, a server for vehicle-based communication is provided. The server includes a memory and a processor coupled to the memory. The processor is configured to perform: receiving, from a first communication device corresponding to a first vehicle, license plate information of a second vehicle and a device identifier of the first communication device. The processor is also configured to perform: determining a communication account of a second communication device corresponding to the second vehicle according to the license plate information of the second vehicle; and sending the communication account of the second communication device to the first communication device. The communication account of the second communication device is used for communicating with the second communication device.

Other aspects of the present disclosure can be understood by those skilled in the art in light of the description, the claims, and the drawings of the present disclosure.

BRIEF DESCRIPTION OF THE DRAWINGS

To more clearly describe the technical solutions in the embodiments of the present disclosure, the following briefly describes the accompanying drawings. Apparently, the accompanying drawings show merely some embodiments of the present disclosure, and a person of ordinary skill in the art may still derive other drawings from these accompanying drawings without creative efforts.

DESCRIPTION OF EMBODIMENTS

Figure 1:
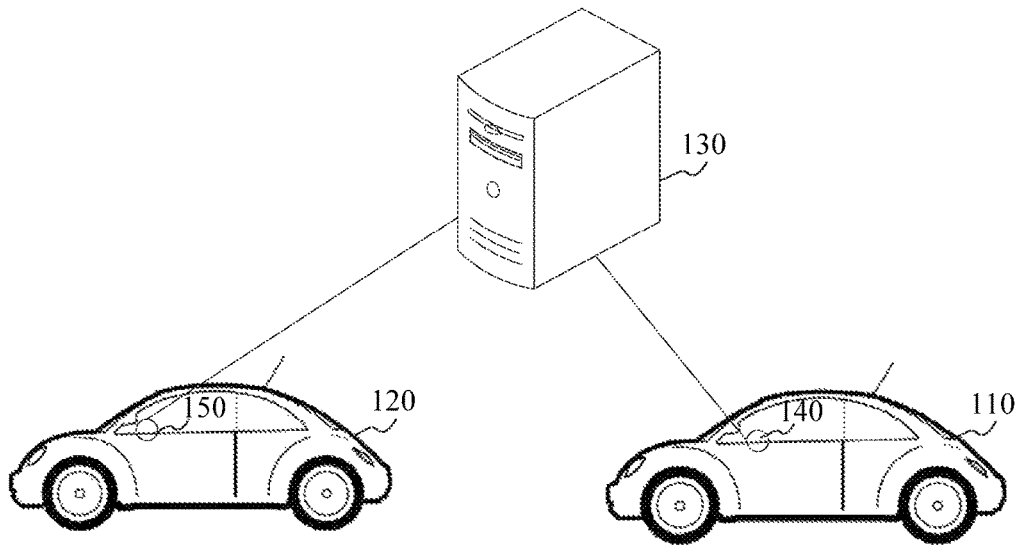
FIG. 1 is a schematic diagram of an implementation environment of a vehicle-based communication method according to some exemplary embodiments.

To make the objectives, technical solutions, and advantages of the present disclosure clearer, the following further describes implementations of the present disclosure in detail with reference to the accompanying drawings.

As explained, when a driver of a vehicle needs to communicate with another driver of a front vehicle, the driver of the tailing or back vehicle needs to have contact information of the driver of the front vehicle, or communicate with the driver of the front vehicle after getting the attention of the driver of the front vehicle using whistling or the like.

If the driver of the back vehicle does not have the contact information of the driver of the front vehicle, or the driver of the back vehicle cannot contact with the driver of the front vehicle using another method, the driver of the back vehicle cannot communicate with the driver of the front vehicle.

In an embodiment of the present disclosure, if a communication needs to be performed among strangers based on their vehicles, first, drivers are generally strangers, and a driver of a first vehicle having a first communication device may be unable to obtain a device identifier of a second communication device of a second vehicle. Even if the device identifier of the second communication device is obtained, and communication with the second communication device is established, a subsequent communication may not be needed at any time because strangers do not communicate with each other all the way. If a communication between the first communication device and the second communication device needs to be established, the driver of the first vehicle needs to manually obtain the device identifier of the second communication device of the second vehicle, for example, by scanning a code or manually recording. The driver of the first vehicle, initiates, by using the communication device of the first vehicle, a communication request to a server such as a social network server, the communication request carrying the device identifier of the second communication device and a device identifier of the first communication device. The server sends the device identifier of the first communication device and an adding request to the second communication device, to request the second communication device to add the first communication device as a friend. After confirmation information of the second communication device is received, the communication between the first communication device and the second communication device is established. When communication devices of a plurality of vehicles need to communicate with the second communication device of the second vehicle, drivers of the plurality of vehicles all need to manually obtain the device identifier of the second communication device, for example, by scanning a code, and before communications are established, whether the second communication device allows to establish communication connections with all the communication devices of the plurality of vehicles needs to be verified. However, manually adding a device identifier of a communication device consumes longer time and, consequently, the entire communication process consumes longer time. In addition, a plurality of interactions needs to be performed between a communication device and a server, consequently, more system resources are consumed.

FIG. 1 is a schematic structural diagram of an implementation environment according to an embodiment of the present disclosure. Referring to FIG. 1, the implementation environment includes: a first vehicle 110, a second vehicle 120, a server 130, a first communication device 140, and a second communication device 150.

The first communication device 140 corresponds to the first vehicle 110, that is, the first communication device 140 is bond to the first vehicle 110, and has a data transmission capability. The first communication device 140 may be one electronic device, or a plurality of electronic devices. For example, the first communication device 140 is a first driving-data recorder in the first vehicle 110, or a first driving-data recorder and a social-network-client in the first vehicle 110. The social-network-client is an instant messaging application program, for example, MSN, WeChat, or QQ.

The second communication device 150 corresponds to the second vehicle 120, that is, the second communication device 150 is bond to the second vehicle 120, and has the data transmission capability. For example, the second communication device 150 is a second driving-data recorder in the second vehicle 120, or a mobile terminal held by a driver of the second vehicle 120. A social-network-client is installed in the mobile terminal, and the social-network-client is an instant messaging application program, for example, MSN, WeChat, or QQ.

The server 130 may be one server, a server cluster including a plurality of servers, or a cloud computing center.

When the first communication device 140 is the first driving-data recorder, and the second communication device 150 is the second driving-data recorder, the server 130 is a backend server of the driving-data recorders, and the server 130 stores a correspondence between a license plate number and a device identifier of a driving-data recorder. When the first communication device 140 is the first driving-data recorder and the social-network-client, and the second communication device 150 is the mobile terminal, the server 130 stores a correspondence between a license plate number, a social-network account, and a device identifier of a driving-data recorder.

The second vehicle 120 is located in any direction from the first vehicle 110. For example, the second vehicle 120 is located right in front of the first vehicle 110, or the second vehicle 120 is located right behind the first vehicle 110, or the second vehicle 120 is located at the front left or the back left of the first vehicle 110, or the second vehicle 120 is located at the front right or the back right of the first vehicle 110.

The first communication device 140 may be connected to the server 130 by a wireless network. The second communication device 150 may also be connected to the server 130 by using the wireless network.

Figure 2:
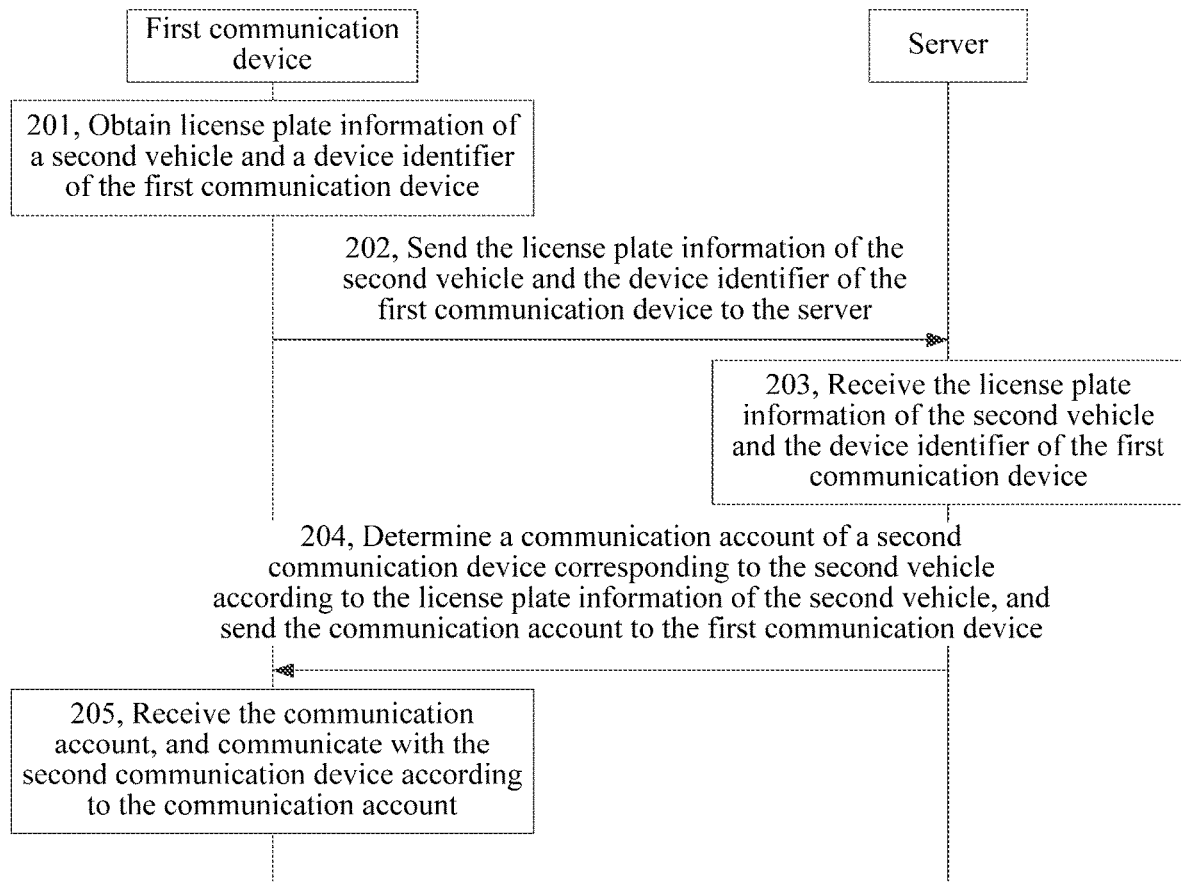
FIG. 2 is a flowchart of a communication method according to an exemplary embodiment.

FIG. 2 is a flowchart of a communication method according to an exemplary embodiment of the present disclosure. Description is given by using an example in which the communication method is applied in the implementation environment shown in FIG. 1. Referring to FIG. 2, the communication method includes the followings.

Step S201: A first communication device obtains license plate information of a second vehicle and a device identifier of the first communication device.

The license plate information of the second vehicle may be a license plate image containing a license plate number of the second vehicle, or may be the license plate number of the second vehicle.

When the license plate information of the second vehicle is the license plate image, the first communication device may capture the license plate image of the second vehicle.

In this case, a position relationship between the second vehicle and the first vehicle relies on a direction of a camera in the first communication device.

To enable the first communication device to obtain the license plate information of the second vehicle, a license plate of the second vehicle needs to be in a photography range of the camera of the first communication device, and the first communication device needs to extract the license plate information of the second vehicle from a captured image. For example, when the camera is located at the front of the first communication device, the second vehicle is located right in front of the first vehicle; when the camera is located at the rear end of the first communication device, the second vehicle is located right behind the first vehicle; when the camera is located at the front left of the first communication device, the second vehicle is located at the front left of the first vehicle; when the camera is located at the back left of the first communication device, the second vehicle is located at the back left of the first vehicle; when the camera is located at the front right of the first communication device, the second vehicle is to located at the front right of the first vehicle; and when the camera is located at the back right of the first communication device, the second vehicle is located at the back right of the first vehicle.

When the license plate information of the second vehicle is the license plate number, a user may manually input the license plate number of the second vehicle into the first communication device, that is, the first device obtains the license plate number of the second vehicle that is inputted by the user by manual input or voice input.

Step S202: The first communication device sends the license plate information of the second vehicle and the device identifier of the first communication device to a server.

Step S203: The server receives the license plate information of the second vehicle and the device identifier of the first communication device.

Step S204: The server determines a communication account of a second communication device corresponding to the second vehicle according to the license plate information of the second vehicle, and sends the communication account of the second communication device to the first communication device.

The server may determine, according to the device identifier of the first communication device, to send the communication account of the second communication device to the first communication device.

Step S205: The first communication device receives the communication account of the second communication device, and communicates with the second communication device according to the communication account of the second communication device.

Step S201, step S202, and step S205 may be independently implemented as an embodiment at the first communication device side, and step S203 and step S204 may be independently implemented as an embodiment at the server side.

Based on the above, in the communication method provided in one embodiment of the present disclosure, the first communication device obtains the license plate information of the second vehicle and the device identifier of the first communication device, and sends the license plate information of the second vehicle and the device identifier of the first communication device to the server, and the server determines the communication account of the second communication device corresponding to the second vehicle according to the license plate information of the second vehicle, and sends the communication account of the second communication device to the first communication device. Because the server determines the communication account of the second communication device by using the license plate information of the second vehicle that is sent by the first communication device corresponding to the first vehicle, after receiving the communication account of the second communication device, the first communication device may communicate with the second communication device directly, avoiding a problem that because a driver of the first vehicle does not have a way to contact a driver of the second vehicle, the driver of the first vehicle cannot communicate with the driver of the second vehicle, and achieving an effect that the driver of the first vehicle can conveniently make contact with the driver of the second vehicle, and communicate with the driver of the second vehicle.

In an embodiment of the present disclosure, if a communication needs to be performed among strangers based on vehicles, first, drivers are generally strangers, and a driver of a first vehicle may not obtain a device identifier of a second communication device of a second vehicle. Even the device identifier of the second communication device is obtained, and a communication with the second communication device is established, a subsequent communication may not be needed at any time because the strangers do not communicate with each other all the way. If a communication between a first communication device and the second communication device needs to be established, in general the driver of the first vehicle needs to manually obtain the device identifier of the second communication device of the second vehicle, for example, by scanning a code or manually recording, initiates, by using the communication device of the first vehicle, a communication request to a server such as a social network server, the communication request carrying the device identifier of the second communication device and a device identifier of the first communication device; and the server sends the device identifier of the first communication device and an adding request to the second communication device, to request the second communication device to add the first communication device as a friend. After confirmation information of the second communication device is received, the communication between the first communication device and the second communication device is established.

When communication devices of a plurality of vehicles need to communicate with the second communication device of the second vehicle, drivers of the plurality of vehicles all need to manually obtain the device identifier of the second communication device, for example, by scanning a code, and before communications are established, whether the second communication device allows to establish communication connections with all the communication devices of the plurality of vehicles needs to be verified. Manually adding a device identifier of a communication device consumes longer time, consequently, the entire communication process consumes longer time. In addition, a plurality of interactions needs to be performed between a communication device and a communication device and a server, consequently, more system resources are consumed.

In certain embodiments of the present disclosure, a correspondence between first communication device and the second communication device is not established between the application steps. The driver of the first vehicle and a driver of the second vehicle may be strangers before. A vehicle needing to participate in the communication registers to a server in advance, and the server pre-stores a correspondence between license plate information of a vehicle and a communication account of a communication device of the vehicle. A communication device may obtain a communication account of the other vehicle by using the server and license plate information of the other vehicle, and establishes a communication with the other vehicle by using the communication account of the other vehicle. By using the technical solution of the present disclosure, a communication may be established between non-friends, for example, strangers met on the road, by using license plate information of vehicles and communication accounts of communication devices. Therefore, the entire communication process is relatively convenient, and consumes less time.

Figure 3A:
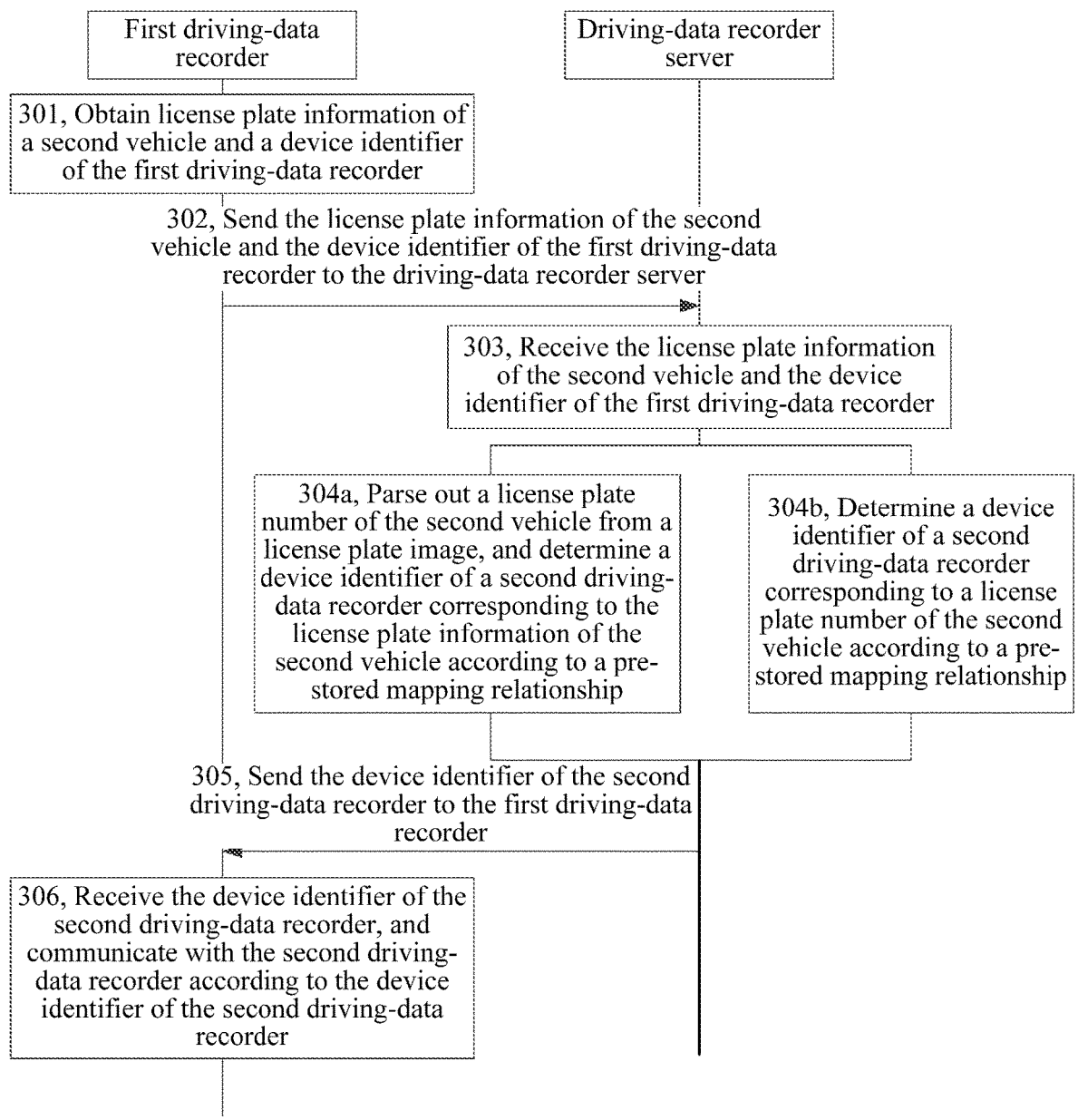
FIG. 3A is a flowchart of a communication method according to another exemplary embodiment.

FIG. 3A is a flowchart of a communication method according to an exemplary embodiment of the present disclosure. Descriptions are given by using an example in which the communication method is applied in the implementation environment shown in FIG. 1. Referring to FIG. 3A, when a server is a driving-data recorder server, a first communication device is a first driving-data recorder, a second communication device is a second driving-data recorder, and a communication account of the second communication device is a device identifier of the second driving-data recorder, the communication method includes the following steps:

Step S301: A first driving-data recorder obtains license plate information of a second vehicle and a device identifier of the first driving-data recorder.

When a first vehicle travels in a certain direction from the second vehicle, a driver of the first vehicle needs to communicate with a driver of the second vehicle, and the driver of the first vehicle starts, by triggering a shortcut key, a process of establishing a communication with the second vehicle. Specifically, after the shortcut key is triggered, the first driving-data recorder obtains the license plate information of the second vehicle and the device identifier of the first driving-data recorder. The shortcut key is disposed at a position that is easily touched by the driver. For example, the shortcut key is disposed on a steering wheel.

When the license plate information of the second vehicle is a license plate image captured by the first driving-data recorder, the first driving-data recorder photographs a license plate of the second vehicle, and obtains the license plate image. In this case, a position relationship between the second vehicle and the first vehicle relies on a direction of a camera in the first driving-data recorder. When the camera is located right in front of the first vehicle, the second vehicle is located right in front of the first vehicle; when the camera is located right behind the first vehicle, the second vehicle is located right behind the first vehicle; when the camera is located at the front left of the first vehicle, the second vehicle is located at the front left of the first vehicle; when the camera is located at the back left of the first vehicle, the second vehicle is located at the back left of the first vehicle; when the camera is located at the front right of the first vehicle, the second vehicle is located at the front right of the first vehicle; and when the camera is located at the back right of the first vehicle, the second vehicle is located at the back right of the first vehicle.

Alternatively, when the license plate information of the second vehicle is a license plate number parsed out by the first driving-data recorder from a captured license plate image, the first driving-data recorder photographs a license plate of the second vehicle, obtains the license plate image, and parses the license plate image to obtain the license plate number of the second vehicle; and alternatively, a user may input the license plate number of the second vehicle into the first driving-data recorder by manual input or voice input, and when the first driving-data recorder obtains the license plate number of the second vehicle that is inputted by the user by the manual input or voice input, the first driving-data recorder does not need to photograph the license plate of the second vehicle, and does not need to parse the license plate image of the second vehicle, that is, step S304a and step S304b are not performed.

Step S302: The first driving-data recorder sends the license plate information of the second vehicle and the device identifier of the first driving-data recorder to a driving-data recorder server.

Specifically, the first driving-data recorder sends the license plate image and the device identifier of the first driving-data recorder to the driving-data recorder server, or the first driving-data recorder sends the license plate number of the second vehicle and the device identifier of the first driving-data recorder to the driving-data recorder server.

Step S303: The driving-data recorder server receives the license plate information of the second vehicle and the device identifier of the first driving-data recorder.

When the license plate information of the second vehicle is the license plate image captured by the first driving-data recorder, step S304a is performed; and when the license plate information of the second vehicle is the license plate number parsed out by the first driving-data recorder from the captured license plate image, step S304b is performed.

Step S304a: The driving-data recorder server parses out a license plate number of the second vehicle from a license plate image, and determines a device identifier of a second driving-data recorder corresponding to the license plate information of the second vehicle according to a preset mapping relationship.

The mapping relationship stored in the driving-data recorder server is used for recording a correspondence between the license plate number of the second vehicle and the device identifier of the second driving-data recorder corresponding to the second vehicle.

Table 1 shows an example of a part of the preset mapping relationship in the driving-data recorder server.

TABLE 1

| License plate number | Device identifier of a driving-data recorder |
|---|---|
| JS W 123XX | Q123 |
| ZJ P 000XX | Q124 |
| BJ L 00XX0 | Q125 |
| JS K0XX12 | Q126 |

For example, when parsing out from the license plate image that the license plate number of the second vehicle is "ZJ P 000XX", the driving-data recorder server determines that the identifier of the second driving-data recorder corresponding to the license plate number of the second vehicle of "ZJ P 000XX" is "Q124".

Step S304b: The driving-data recorder server determines a device identifier of a second driving-data recorder corresponding to a license plate number of the second vehicle according to a preset mapping relationship.

Step S305: The driving-data recorder server sends the device identifier of the second driving-data recorder to the first driving-data recorder.

Step S306: The first driving-data recorder receives the device identifier of the second driving-data recorder, and communicates with the second driving-data recorder according to the device identifier of the second driving-data recorder.

After receiving the device identifier of the second driving-data recorder that is sent by the driving-data recorder server, the first driving-data recorder prompts, by using a voice method or a text method, the driver of the first vehicle to send a communication request to the second driving-data recorder. Further, after it is confirmed that the driver of the first vehicle sends the communication request to the second driving-data recorder, the first driving-data recorder communicates with the second driving-data recorder; or after receiving the device identifier of the second driving-data recorder that is sent by the driving-data recorder server, the first driving-data recorder does not prompt the user, and directly communicates with the second driving-data recorder.

After the first driving-data recorder establishes a communication with the second driving-data recorder, the driving-data recorder server routes messages between them, so as to realize the communication between the first driving-data recorder and the second driving-data recorder.

After the first driving-data recorder establishes the communication with the second driving-data recorder, when the first driving-data recorder sends a message to the second driving-data recorder, the first driving-data recorder sends the message carrying the device identifier of the second driving-data recorder to the driving-data recorder server. After receiving the message sent by the first driving-data recorder, the driving-data recorder server determines the second driving-data recorder according to the device identifier of the second driving-data recorder, and forwards the message to the second driving-data recorder; similarly. When the second driving-data recorder sends a message to the first driving-data recorder, the second driving-data recorder sends the message carrying the device identifier of the first driving-data recorder to the driving-data recorder server. After receiving the message sent by the second driving-data recorder, the driving-data recorder server determines the first driving-data recorder according to the device identifier of the first driving-data recorder, and forwards the message to the first driving-data recorder.

For example, in a traveling process of the first vehicle, the driver of the first vehicle finds that an object falls from the second vehicle in the front, the driver of the first vehicle triggers the shortcut key and uses a driving-data recorder to establish the communication with the second driving-data recorder by using the first driving-data recorder. The driver of the first vehicle then uses the first driving-data recorder to send a message of "you have an object falling down" to the second driving-data recorder. Specifically, the first driving-data recorder sends the message of "you have an object falling down" carrying the device identifier of the second driving-data recorder to the driving-data recorder server. The driving-data recorder server receives the message, determines the second driving-data recorder according to the device identifier of the second driving-data recorder, and sends the message of "you have an object falling down" to the second driving-data recorder. The driver of the second vehicle can check, by using the second driving-data recorder, the message of "you have an object falling down" sent by the driver of the first vehicle.

The foregoing step S301, step S302, and step S306 may be independently implemented as an embodiment at the first communication device side, and step S303, step S304a, step S304b, and step S305 may be independently implemented as an embodiment at the driving-data recorder server side.

Based on the above, in the communication method provided in one embodiment of the present disclosure, the first communication device obtains the license plate information of the second vehicle and the device identifier of the first communication device, and sends the license plate information of the second vehicle and the device identifier of the first communication device to the server, and the server determines the communication account of the second communication device corresponding to the second vehicle according to the license plate information of the second vehicle, and sends the communication account of the second communication device to the first communication device. Because the server determines the communication account of the second communication device by using the license plate information of the second vehicle that is sent by the first communication device corresponding to the first vehicle, after receiving the communication account of the second communication device, the first communication device may communicate with the second communication device, avoiding a problem that because the driver of the first vehicle does not have a way to contact the driver of the second vehicle, the driver of the first vehicle cannot communicate with the driver of the second vehicle, and achieving an effect that the driver of the first vehicle can conveniently contact with the driver of the second vehicle, and communicate with the driver of the second vehicle.

Figure 3B:
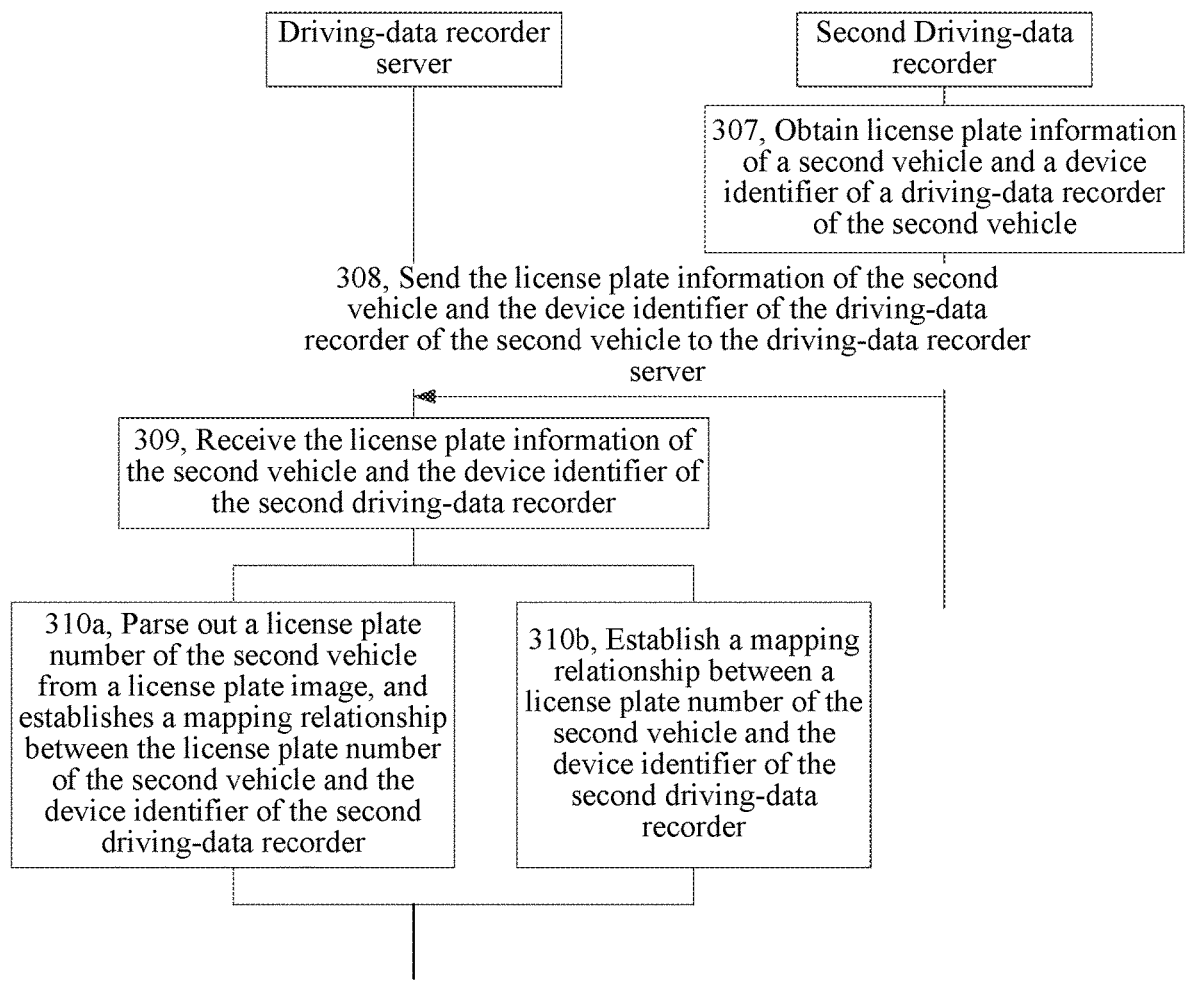
FIG. 3B is a flowchart of a communication method according to another exemplary embodiment.

Furthermore, in one embodiment shown in FIG. 3A, before the server determines the communication account of the second communication device corresponding to the second vehicle according to the license plate information of the second vehicle, the second communication device further needs to send the license plate information of the second vehicle and an identifier of the second communication device to the driving-data recorder server. That is, the communication method further includes the following steps shown in FIG. 3B.

Step S307: A second driving-data recorder obtains license plate information of a second vehicle and a device identifier of a driving-data recorder of the second vehicle.

The license plate information of the second vehicle obtained by the second driving-data recorder is a license plate image obtained by the second driving-data recorder by photographing a license plate of the second vehicle, or is the license plate number of the second vehicle that is obtained by parsing the license plate image after the second driving-data recorder photographs the license plate of the second vehicle and obtains the license plate image.

Step S308: The second driving-data recorder sends the license plate information of the second vehicle and the device identifier of the second driving-data recorder to the driving-data recorder server.

Step S309: The driving-data recorder server receives the license plate information of the second vehicle and the device identifier of the second driving-data recorder.

When the license plate information is the license plate image captured by the second driving-data recorder, the driving-data recorder server performs step S310a; and when the license plate information is the license plate number parsed out by the second driving-data recorder from the captured license plate image, the driving-data recorder server performs step S310b.

Step S310a: The driving-data recorder server parses out a license plate number of the second vehicle from a license plate image, and establishes a mapping relationship between the license plate number of the second vehicle and the device identifier of the second driving-data recorder.

Step S310b: The driving-data recorder server establishes a mapping relationship between a license plate number of the second vehicle and the device identifier of the second driving-data recorder.

It should be noted that step S307 and step S310b may alternatively be performed before step S304a or step S304b. This is not limited to one embodiment of the present disclosure.

Figure 4:
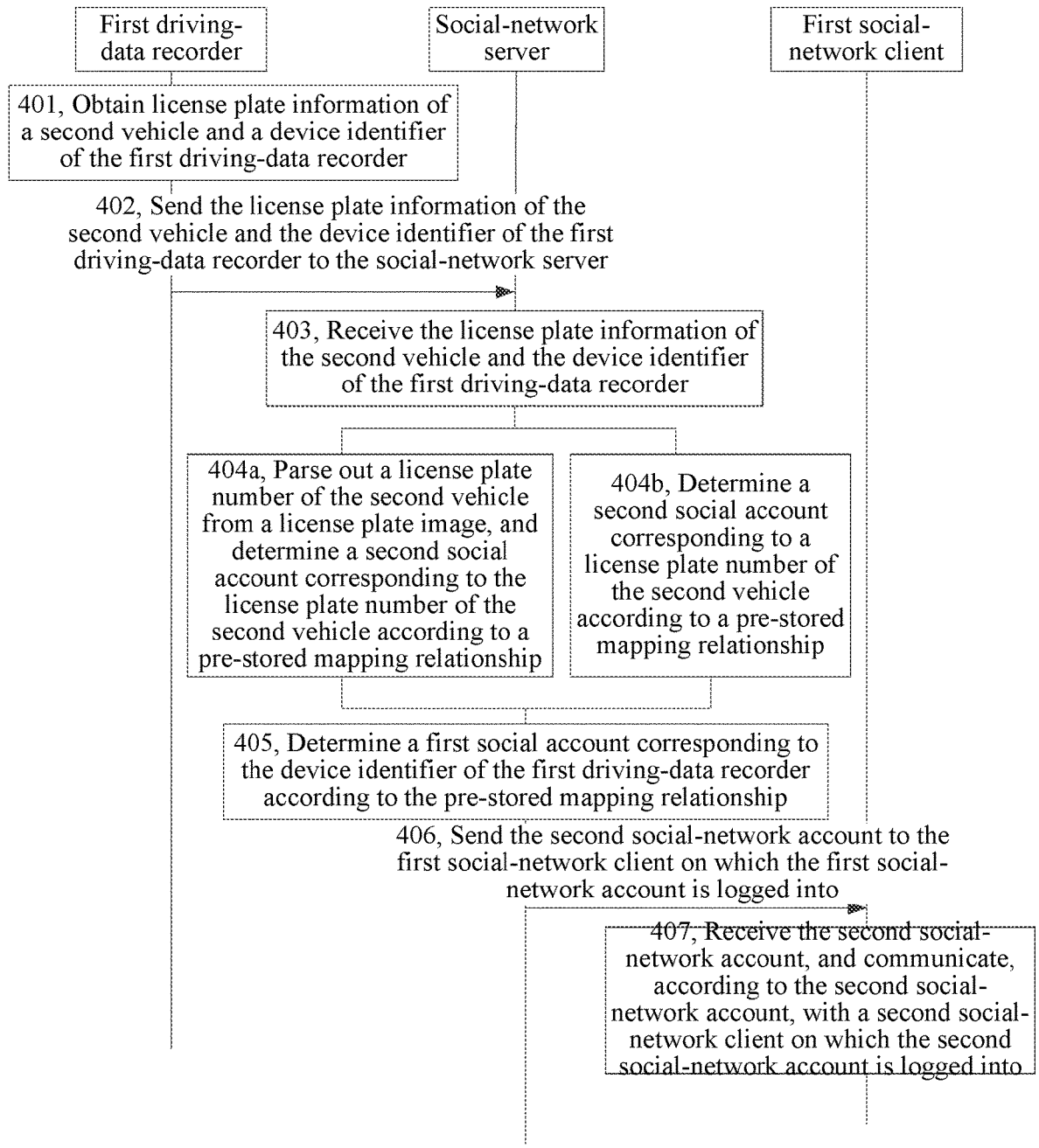
FIG. 4 is a flowchart of a communication method according to another exemplary embodiment.

FIG. 4 is a flowchart of a communication method according to another exemplary embodiment of the present disclosure. Descriptions are given by using an example in which the communication method is applied in the implementation environment shown in FIG. 1. Referring to FIG. 4, when a server is a social-network server, a first communication device includes a first driving-data recorder and a first social-network-client, a second communication device is a second social-network-client, a communication account of the first communication device is a first social-network account, and a communication account of the second communication device is a second social-network account, the communication method includes the following steps.

Step S401: A first driving-data recorder obtains license plate information of a second vehicle and a device identifier of the first driving-data recorder.

In one embodiment, a position relationship between the second vehicle and a first vehicle relies on a direction of a camera in the first driving-data recorder. When the camera is located right in front of the first driving-data recorder, the second vehicle is located right in front of the first vehicle; when the camera is located right behind the first driving-data recorder, the second vehicle is located right behind the first vehicle; when the camera is located at the front left of the first driving-data recorder, the second vehicle is located at the front left of the first vehicle; when the camera is located at the back left of the first driving-data recorder, the second vehicle is located at the back left of the first vehicle; when the camera is located at the front right of the first driving-data recorder, the second vehicle is located at the front right of the first vehicle; and when the camera is located at the back right of the first driving-data recorder, the second vehicle is located at the back right of the first vehicle. A specific implementation process of this step is described in detail in the foregoing step S301, and details are not described herein again.

It should be noted that, in addition to that the first communication device automatically obtains the license plate information of the second vehicle, a user may alternatively input a license plate number of the second vehicle into the first driving-data recorder by manual input or voice input. When the first driving-data recorder obtains the license plate number of the second vehicle that is inputted by the user by the manual input or voice input, the first driving-data recorder does not need to photograph a license plate of the second vehicle, and does not need to parse a license plate image of the second vehicle, that is, step S404a and step S404b are not performed.

Step S402: The first driving-data recorder sends the license plate information of the second vehicle and the device identifier of the first driving-data recorder to a social-network server.

The first driving-data recorder sends the license plate image and the device identifier of the first driving-data recorder to the social-network server, or the first driving-data recorder sends the license plate number of the second vehicle and the device identifier of the first driving-data recorder to the social-network server.

Step S403: The social-network server receives the license plate information of the second vehicle and the device identifier of the first driving-data recorder.

When the license plate information is the license plate image captured by the first driving-data recorder, the social-network server performs step S404a; and when the license plate information is the license plate number parsed out by the first driving-data recorder from the captured license plate image, the social-network server performs step S404b.

Step S404a: The social-network server parses out a license plate number of the second vehicle from a license plate image, and determines a second social-network account corresponding to the license plate number of the second vehicle according to a preset mapping relationship.

The preset mapping relationship in the social-network server is used for recording a correspondence between a license plate number, a social-network account, and a device identifier of a driving-data recorder. That is, the social-network server stores a correspondence between a license plate number of the first vehicle, the first social-network account, and the device identifier of the first driving-data recorder, and a correspondence between the license plate number of the second vehicle, the second social-network account, and a device identifier of the second driving-data recorder.

Table 2 shows an example of a part of the preset mapping relationship in the social-network server.

TABLE 2

| License plate number | Social-network account | Device identifier of a driving-data recorder |
|---|---|---|
| JS S 99XX1 | Xiao Wang | Q1 |
| GD W 00xx2 | Xiao Zhao | Q2 |
| JS Q 90XX3 | Xiao Li | Q3 |

For example, when parsing out from the license plate image that the license plate number of the second vehicle is "JS S 99XX1", the social-network server determines that the second social-network account corresponding to the license plate number of "JS S 99XX1" is "Xiao Wang".

Step S404b: The social-network server determines a second social-network account corresponding to a license plate number of the second vehicle according to a preset mapping relationship.

The social-network server determines the second social-network account corresponding to the license plate number of the second vehicle according to the received license plate number of the second vehicle and the preset mapping relationship.

Step S405: The social-network server determines a first social-network account corresponding to the device identifier of the first driving-data recorder according to the preset mapping relationship.

The mapping relationship stored in the social-network server is Table 2 is used as an example. When the received device identifier of the first driving-data recorder is "Q3", the social-network server determines that the first social-network account is "Xiao Li".

Step S406: The social-network server sends the second social-network account to a first social-network-client on which the first social-network account is logged into.

Step S407: The first social-network-client receives the second social-network account, and communicates, according to the second social-network account, with a second social-network-client on which the second social-network account is logged into.

After the first social-network-client establishes a communication with the second social-network-client, the driver of the first vehicle may implement the communication with the driver of the second vehicle by using the first social-network account logged into on the first social-network-client and the second social-network account logged into on the second social-network-client.

After the first social-network-client receives the second social-network account sent by the social-network server, the first social-network-client prompts, by using a voice method or a text method, the driver of the first vehicle to send a communication request to the second social-network account. After it is confirmed that the driver of the first vehicle sends the communication request to the second social-network account, the first social-network-client communicates with the second social-network-client; or after receiving the second social-network account sent by the social-network server, the first social-network-client does not prompt the driver of the first vehicle, and directly communicates with the second social-network-client.

After the first social-network-client establishes the communication with the second social-network-client, the social-network server forwards messages between them, so as to implement the communication between the driver of the first vehicle and the driver of the second vehicle.

After the first social-network-client establishes the communication with the second social-network-client, when the first social-network-client on which the first social-network account is logged into sends a message to the second social-network-client on which the second social-network account is logged into, the first social-network-client sends the message carrying the second social-network account to the social-network server. After receiving the message sent by the first social-network-client, the social-network server determines the second social-network-client according to the second social-network account, and forwards the message to the second social-network-client. Similarly, the second social-network-client on which the second social-network account is logged into sends a message to the first social-network-client on which the first social-network account is logged into, the second social-network-client sends the message carrying the first social-network account to the social-network server. After receiving the message sent by the second social-network-client, the social-network server determines the first social-network-client according to the first social-network account, and forwards the message to the first social-network-client.

For example, in a traveling process of the first vehicle, the driver of the first vehicle finds that an object falls from the second vehicle ahead, the driver of the first vehicle triggers a shortcut key, and the first social-network-client on which the first social-network account is logged into establishes the communication with the second social-network-client on which the second social-network account is logged into. The driver of the first vehicle uses the first social-network-client on which the first social-network account is logged into to send a message of "you have an object falling down" to the second social-network-client. Specifically, the first social-network-client sends the message of "you have an object falling down" carrying the second social-network account to the social-network server, the social-network server determines the second social-network-client according to the second social-network account, and sends the message of "you have an object falling down" to the second social-network-client, and the driver of the second vehicle can check, by using the second social-network-client on which the second social-network account is logged into, the message of "you have an object falling down" sent by the driver of the first vehicle.

The foregoing step S401, step S402, and step S407 may be independently implemented at the first communication device side, and step S403 to step S406 may be independently implemented at the social-network server side.

Based on the above, in the communication method provided in one embodiment of the present disclosure, the first communication device obtains the license plate information of the second vehicle and the device identifier of the first communication device, and sends the license plate information of the second vehicle and the device identifier of the first communication device to the server, and the server determines the communication account of the second communication device corresponding to the second vehicle according to the license plate information of the second vehicle, and sends the communication account of the second communication device to the first communication device. Because the server determines the communication account of the second communication device by using the license plate information of the second vehicle that is sent by the first communication device corresponding to the first vehicle, after receiving the communication account of the second communication device, the first communication device may communicate with the second communication device, avoiding a problem that, because the driver of the first vehicle does not have a way to contact the driver of the second vehicle, the driver of the first vehicle cannot communicate with the driver of the second vehicle, and achieving an effect that the driver of the first vehicle can conveniently contact with the driver of the second vehicle, and communicate with the driver of the second vehicle.

Figure 5:
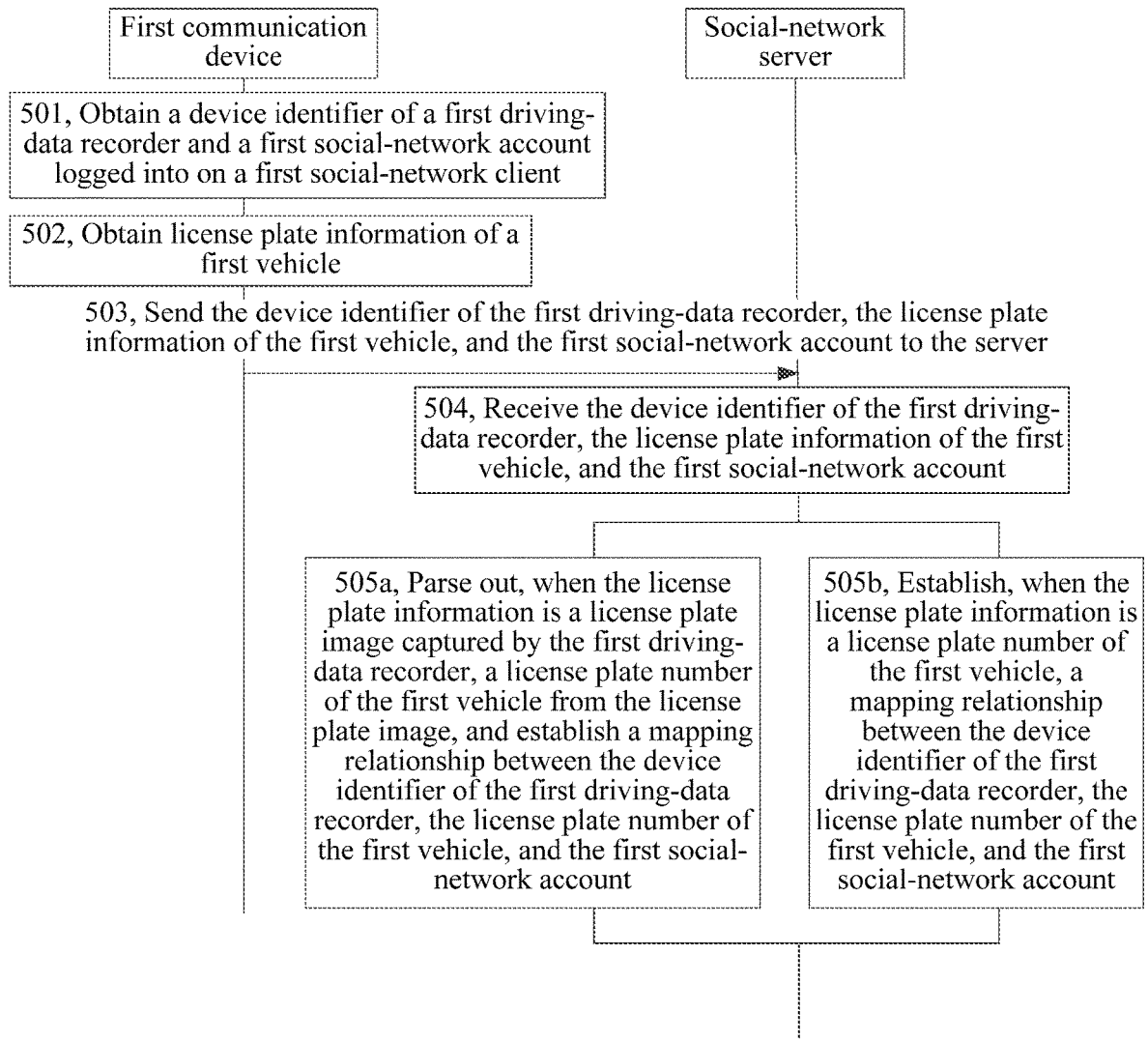
FIG. 5 is a flowchart of a communication method according to another exemplary embodiment.

Furthermore, in one embodiment shown in FIG. 4, before the first communication device obtains the license plate information of the second vehicle and the device identifier of the first communication device, the first communication device further needs to send license plate information of the first vehicle and the identifier of the first communication device to the social-network server. That is, before step S401, the communication method further includes the following steps shown in FIG. 5.

Step S501: A first communication device obtains a device identifier of a first driving-data recorder and a first social-network account logged into on a first social-network-client.

When the first communication device includes the first driving-data recorder and the first social-network-client, the first social-network-client may obtain the device identifier of the first driving-data recorder and the first social-network account logged into on the first social-network-client; or the first driving-data recorder may obtain the device identifier of the first driving-data recorder and the first social-network account logged into on the first social-network-client.

Step S502: The first communication device obtains license plate information of a first vehicle.

In one embodiment, the first driving-data recorder may obtain the license plate information of the first vehicle, or the first social-network-client may obtain the license plate information of the first vehicle.

Specifically, when the first communication device includes the first driving-data recorder and the first social-network-client, the license plate information of the first vehicle may be a license plate image captured by the first driving-data recorder, or a license plate number of the first vehicle that is parsed out by the first driving-data recorder from the license plate image, or the license plate number of the first vehicle that is manually inputted into the first social-network-client by a user. This is not limited to one embodiment of the present disclosure.

It should be noted that an execution sequence of the foregoing step S501 and step S502 may be reversed. This is not limited to one embodiment of the present disclosure.

Step S503: The first communication device sends the device identifier of the first driving-data recorder, the license plate information of the first vehicle, and the first social-network account to a server.

Specifically, the first driving-data recorder sends the device identifier of the first driving-data recorder, the license plate information of the first vehicle, and the first social-network account to the server, or the first social-network-client sends the device identifier of the first driving-data recorder, the license plate information of the first vehicle, and the first social-network account to the server.

Step S504: The server receives the device identifier of the first driving-data recorder, the license plate information of the first vehicle, and the first social-network account.

The server receives the device identifier of the first driving-data recorder, the license plate information of the first vehicle, and the first social-network account.

When the license plate information is the license plate image captured by the first driving-data recorder, the server performs step S505a; and when license plate information is the license plate number of the first vehicle, the server performs step S505b.

Step S505a: The server parses out, when the license plate information is a license plate image captured by the first driving-data recorder, a license plate number of the first vehicle from the license plate image, and establishes a mapping relationship between the device identifier of the first driving-data recorder, the license plate number of the first vehicle, and the first social-network account.

Step S505b: The server establishes, when the license plate information is a license plate number of the first vehicle, a mapping relationship between the device identifier of the first driving-data recorder, the license plate number of the first vehicle, and the first social-network account.

Figure 6:
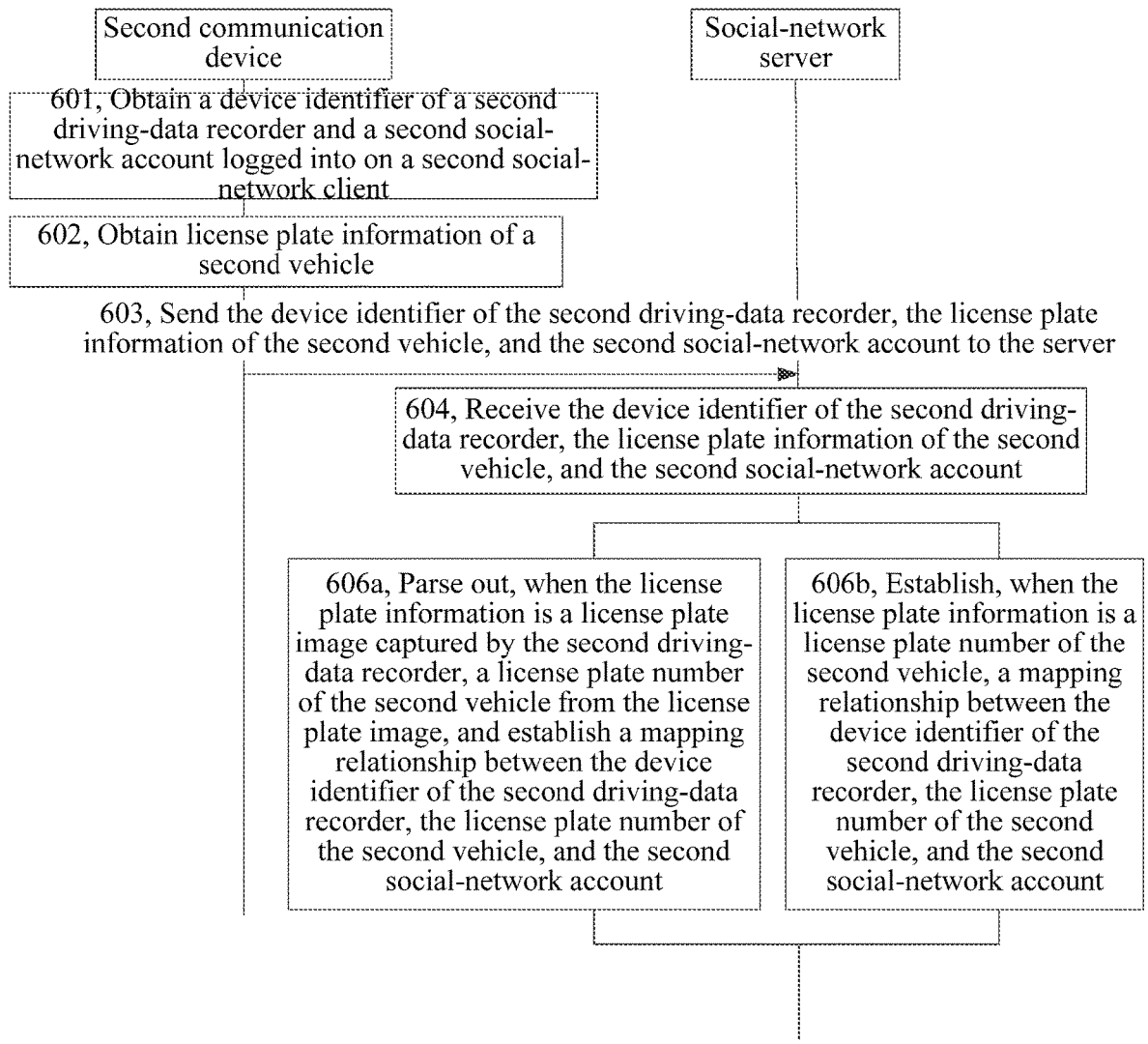
FIG. 6 is a flowchart of a communication method according to another exemplary embodiment.

Further, in one embodiment, before the server determines the communication account of the second communication device corresponding to the second vehicle according to the license plate information of the second vehicle, the second communication device further sends the license plate information of the second vehicle and an identifier of the second communication device to the server. That is, before step S403a or step S403b, the communication method further includes the following steps shown in FIG. 6.

Step S601: A second communication device obtains a device identifier of a second driving-data recorder and a second social-network account logged into on a second social-network-client.

When the second communication device includes the second driving-data recorder and the second social-network-client, the second social-network-client may obtain the device identifier of the second driving-data recorder and the second social-network account logged into on the second social-network-client; or the second driving-data recorder may obtain the device identifier of the second driving-data recorder and the second social-network account logged into on the second social-network-client.

Step S602: The second communication device obtains license plate information of a second vehicle.

In one embodiment, the second driving-data recorder may obtain the license plate information of the second vehicle, or the second social-network-client may obtain the license plate information of the second vehicle.

Specifically, when the second communication device includes the second driving-data recorder and the second social-network-client, the license plate information of the second vehicle may be a license plate image captured by the second driving-data recorder, or a license plate number of the second vehicle that is parsed out by the second driving-data recorder from the license plate image, or is the license plate number of the second vehicle that is manually inputted into the second social-network-client by a user. This is not limited to one embodiment of the present disclosure.

Thus, the second driving-data recorder obtains the license plate information of the second vehicle, or the second social-network-client obtains the license plate information of the second vehicle.

It should be noted that an execution sequence of the foregoing step S601 and step S602 may be reversed. This is not limited to one embodiment of the present disclosure.

Step S603: The second communication device sends the device identifier of the second driving-data recorder, the license plate information of the second vehicle, and the second social-network account to the server.

Specifically, the second driving-data recorder sends the device identifier of the second driving-data recorder, the license plate information of the second vehicle, and the second social-network account to the server, or the second social-network-client sends the device identifier of the second driving-data recorder, the license plate information of the second vehicle, and the second social-network account to the server.

Step S604: The server receives the device identifier of the second driving-data recorder, the license plate information of the second vehicle, and the second social-network account.

The social-network server receives the device identifier of the second driving-data recorder, the license plate information of the second vehicle, and the second social-network account.

When the license plate information is the license plate image captured by the second driving-data recorder, the server performs step S605a; and when license plate information is the license plate number of the second vehicle, the server performs step S605b.

Step S605a: The server parses out, when the license plate information is a license plate image captured by the second driving-data recorder, a license plate number of the second vehicle from the license plate image, and establishes a mapping relationship between the device identifier of the second driving-data recorder, the license plate number of the second vehicle, and the second social-network account.

Step S605b: The server establishes, when the license plate information is a license plate number of the second vehicle, a mapping relationship between the device identifier of the second driving-data recorder, the license plate number of the second vehicle, and the second social-network account.

Figure 7:
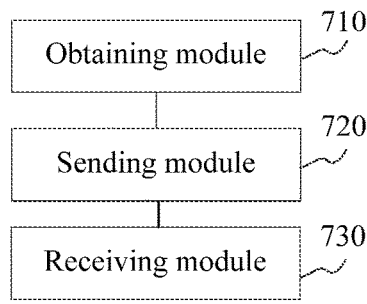
FIG. 7 is a structural block diagram of a communication apparatus according to another exemplary embodiment.

FIG. 7 is a structural block diagram of a communication apparatus according to an exemplary embodiment of the present disclosure. The communication apparatus may be implemented, by using software, hardware, or a combination thereof, as all or part of the first communication device that can provide a communication method. Referring to FIG. 7, the apparatus includes an obtaining module 710, a sending module 720, and a receiving module 730.

The obtaining module 710 is configured to obtain license plate information of a second vehicle and a device identifier of a first communication device. The sending module 720 is configured to send the license plate information of the second vehicle and the device identifier of the first communication device obtained by the obtaining module 710 to a server. The server is connected to the first communication device corresponding to the first vehicle, and the server is configured to: determine a communication account of a second communication device corresponding to the second vehicle according to the license plate information of the second vehicle, and send the communication account to the first communication device. The receiving module 730 is configured to: receive the communication account, and communicate with the second communication device according to the communication account.

Based on the above, in the communication apparatus provided in one embodiment of the present disclosure, the first communication device obtains the license plate information of the second vehicle and the device identifier of the first communication device, and sends the license plate information of the second vehicle and the device identifier of the first communication device to the server, and the server determines the communication account of the second communication device corresponding to the second vehicle according to the license plate information of the second vehicle, and sends the communication account of the second communication device to the first communication device. Because the server determines the communication account of the second communication device by using the license plate information of the second vehicle that is sent by the first communication device corresponding to the first vehicle, after receiving the communication account of the second communication device, the first communication device may communicate with the second communication device, avoiding a problem that because a driver of the first vehicle does not have a way to contact a driver of the second vehicle, the driver of the first vehicle cannot communicate with the driver of the second vehicle, and achieving an effect that the driver of the first vehicle can conveniently contact with the driver of the second vehicle, and communicate with the driver of the second vehicle.

FIG. 7 is a structural block diagram of a communication apparatus according to another exemplary embodiment of the present disclosure. The communication apparatus may be implemented, by using software, hardware, or a combination thereof, as all or part of the first communication device that can provide a communication method. Referring to FIG. 7, the apparatus includes an obtaining module 710, a sending module 720, and a receiving module 730.

The obtaining module 710 is configured to obtain license plate information of a second vehicle and a device identifier of a first communication device. The sending module 720 is configured to send the license plate information of the second vehicle and the device identifier of the first communication device obtained by the obtaining module 710 to a server.

The server is connected to the first communication device corresponding to the first vehicle, and the server is configured to: determine a communication account of a second communication device corresponding to the second vehicle according to the license plate information of the second vehicle, and send the communication account to the first communication device. The receiving module 730 is configured to: receive the communication account, and communicate with the second communication device according to the communication account.

The server is a driving-data recorder server, the first communication device is a first driving-data recorder, the second communication device is a second driving-data recorder, and the communication account of the second communication device is a device identifier of the second driving-data recorder.

The server is a social-network server, the first communication device includes a first driving-data recorder and a first social-network-client, the second communication device is a second social-network-client, a communication account of the first communication device is a first social-network account, and a communication account of the second communication device is a second social-network account.

The obtaining module 710 is specifically configured to obtain, by the first driving-data recorder, the license plate information of the second vehicle and a device identifier of the first driving-data recorder.

The sending module 720 is specifically configured to send, by the first driving-data recorder, the license plate information of the second vehicle and the device identifier of the first driving-data recorder to the social-network server.

Based on the above, in the communication apparatus provided in one embodiment of the present disclosure, the first communication device obtains the license plate information of the second vehicle and the device identifier of the first communication device, and sends the license plate information of the second vehicle and the device identifier of the first communication device to the server, and the server determines the communication account of the second communication device corresponding to the second vehicle according to the license plate information of the second vehicle, and sends the communication account of the second communication device to the first communication device. Because the server determines the communication account of the second communication device by using the license plate information of the second vehicle that is sent by the first communication device corresponding to the first vehicle, after receiving the communication account of the second communication device, the first communication device may communicate with the second communication device, avoiding a problem that because a driver of the first vehicle does not have a way to contact a driver of the second vehicle, the driver of the first vehicle cannot communicate with the driver of the second vehicle, and achieving an effect that the driver of the first vehicle can conveniently contact with the driver of the second vehicle, and communicate with the driver of the second vehicle.

Figure 8:
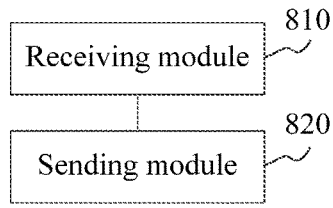
FIG. 8 is a structural block diagram of a communication apparatus according to an exemplary embodiment.

FIG. 8 is a structural block diagram of a communication apparatus according to another exemplary embodiment of the present disclosure. The communication apparatus may be implemented, by using software, hardware, or a combination thereof, as all or part of the first communication device that can provide a communication method. Referring to FIG. 8, the apparatus includes a receiving module 810 and a sending module 820.

The receiving module 810 is configured to receive license plate information of a second vehicle and a device identifier of a first communication device, and the license plate information of the second vehicle is obtained and sent by the first communication device.

The sending module 820 is configured to: determine a communication account of a second communication device corresponding to the second vehicle according to the license plate information of the second vehicle that is received by the receiving module 810, and send the communication account to the first communication device. The first communication device is configured to communicate with the second communication device according to the communication account.

Based on the above, in the communication apparatus provided in one embodiment of the present disclosure, the first communication device obtains the license plate information of the second vehicle and the device identifier of the first communication device, and sends the license plate information of the second vehicle and the device identifier of the first communication device to the server, and the server determines the communication account of the second communication device corresponding to the second vehicle according to the license plate information of the second vehicle, and sends the communication account of the second communication device to the first communication device. Because the server determines the communication account of the second communication device by using the license plate information of the second vehicle that is sent by the first communication device corresponding to the first vehicle, after receiving the communication account of the second communication device, the first communication device may communicate with the second communication device, avoiding a problem that because a driver of the first vehicle does not have a way to contact a driver of the second vehicle, the driver of the first vehicle cannot communicate with the driver of the second vehicle, and achieving an effect that the driver of the first vehicle can conveniently contact with the driver of the second vehicle, and communicate with the driver of the second vehicle.

Figure 9:
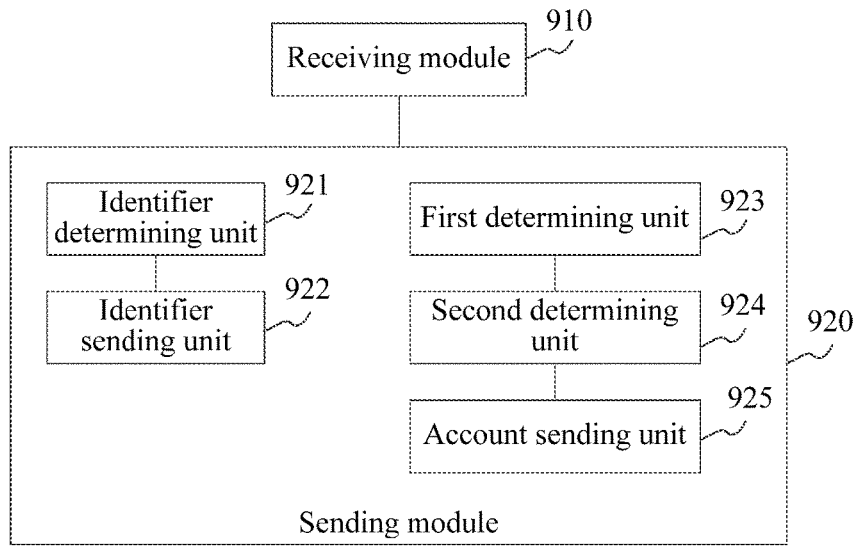
FIG. 9 is a structural block diagram of a communication apparatus according to an exemplary embodiment.

FIG. 9 is a structural block diagram of a communication apparatus according to another exemplary embodiment of the present disclosure. The communication apparatus may be implemented, by using software, hardware, or a combination thereof, as all or part of the first communication device that can provide a communication method. Referring to FIG. 9, the apparatus includes a receiving module 910 and a sending module 920.

The receiving module 910 is configured to receive license plate information of a second vehicle and a device identifier of a first communication device, and the license plate information of the second vehicle is obtained and sent by the first communication device.

The sending module 920 is configured to: determine a communication account of a second communication device corresponding to the second vehicle according to the license plate information of the second vehicle that is received by the receiving module 910, and send the communication account to the first communication device. The first communication device is configured to communicate with the second communication device according to the communication account.

A server is a driving-data recorder server, the first communication device is a first driving-data recorder, the second communication device is a second driving-data recorder, and the communication account of the second communication device is a device identifier of the second driving-data recorder.

The sending module 920 includes an identifier determining unit 921 and an identifier sending unit 922. The identifier determining unit 921 is configured to: parse out, when the license plate information is a license plate image captured by the first driving-data recorder, a license plate number of the second vehicle from the license plate image, and determine the device identifier of the second driving-data recorder corresponding to the license plate number of the second vehicle according to a preset mapping relationship; or determine, when the license plate information is a license plate number parsed out by the first driving-data recorder from a captured license plate image, the device identifier of the second driving-data recorder corresponding to the license plate number of the second vehicle according to a preset mapping relationship.

The identifier sending unit 922 is configured to send the device identifier of the second driving-data recorder to the first driving-data recorder. The preset mapping relationship is used for recording a correspondence between the license plate number and the device identifier of the second driving-data recorder.

The server is a social-network server, the first communication device includes the first driving-data recorder and a first social-network-client, the second communication device is a second social-network-client, a communication account of the first communication device is a first social-network account, and the communication account of the second communication device is a second social-network account.

The sending module 920 includes a first determining unit 923, a second determining unit 924, and an account sending unit 925. The first determining unit 923 is configured to: parse out, when the license plate information is a license plate image captured by the first driving-data recorder, a license plate number of the second vehicle from the license plate image, and determine the second social-network account corresponding to the license plate number of the second vehicle according to a preset mapping relationship; or determine, when the license plate information is a license plate number parsed out by the first driving-data recorder from a captured license plate image, the second social-network account corresponding to the license plate number of the second vehicle according to a preset mapping relationship.

The second determining unit 924, configured to: determining the first social-network account corresponding to a device identifier of the first driving-data recorder according to the preset mapping relationship. The account sending unit 925 is configured to send the second social-network account to the first social-network-client on which the first social-network account is logged into.

Based on the above, in the communication apparatus provided in one embodiment of the present disclosure, the first communication device obtains the license plate information of the second vehicle and the device identifier of the first communication device, and sends the license plate information of the second vehicle and the device identifier of the first communication device to the server, and the server determines the communication account of the second communication device corresponding to the second vehicle according to the license plate information of the second vehicle, and sends the communication account of the second communication device to the first communication device. Because the server determines the communication account of the second communication device by using the license plate information of the second vehicle that is sent by the first communication device corresponding to the first vehicle, after receiving the communication account of the second communication device, the first communication device may communicate with the second communication device, avoiding a problem that because a driver of the first vehicle does not have a way to contact a driver of the second vehicle, the driver of the first vehicle cannot communicate with the driver of the second vehicle, and achieving an effect that the driver of the first vehicle can conveniently contact with the driver of the second vehicle, and communicate with the driver of the second vehicle.

Figure 10:
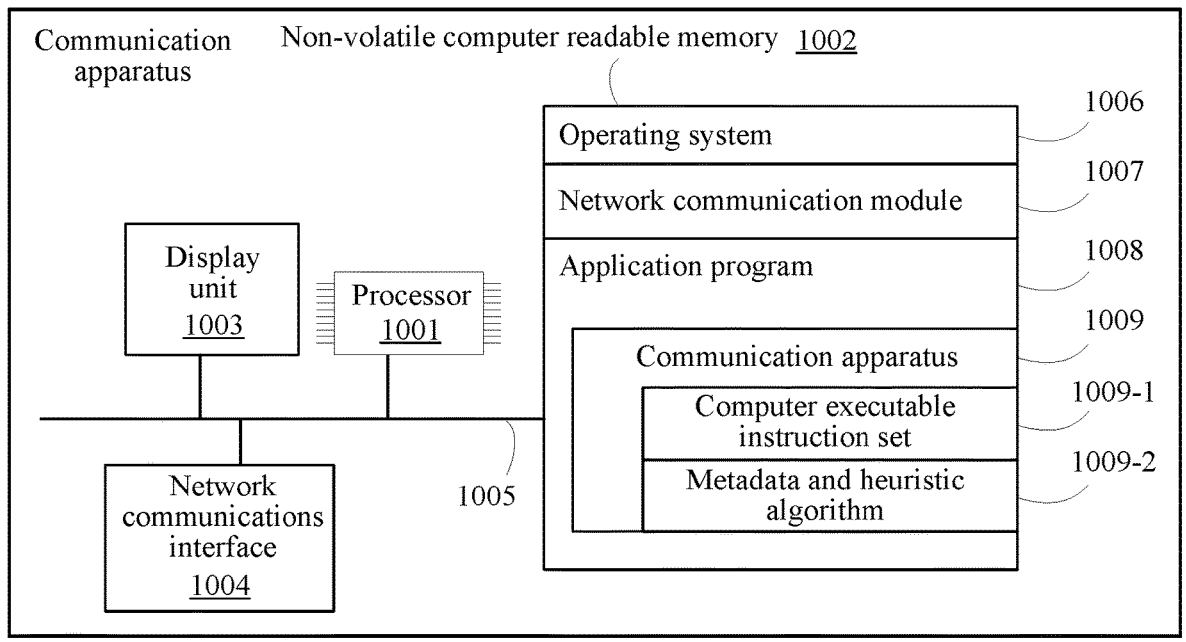
FIG. 10 is a schematic structural diagram of a communication apparatus according to an embodiment of the present disclosure.

FIG. 10 is a schematic structural diagram of a communication apparatus according to an embodiment of the present disclosure. As shown in FIG. 10, the apparatus includes: a processor 1001, a non-volatile computer readable memory 1002, a display unit 1003, and a network communications interface 1004. These components perform communication through a bus 1005.

In one embodiment, the memory 1002 stores multiple program modules, including an operating system 1006, a network communication module 1007, and an application program 1008.

The processor 1001 may read various modules (not shown) included in the application program in the memory 1002, to execute various functional applications and data processing. The processor 1001, in one embodiment, may be one or more of a CPU, a processing unit/module, an ASIC, a logical module, a programmable gate array, or the like.

The application program 1008 may include a communication module 1009. The communication module 1009 may include a computer executable instruction set 1009-1 formed by each functional module in the apparatuses shown in FIG. 7, FIG. 8, or FIG. 9, and a corresponding metadata and heuristic algorithm 1009-2. These computer executable instruction sets may be executed by the processor 1001 to complete the methods shown in FIG. 2 to FIG. 6 or the functions of the apparatuses shown in FIG. 7, FIG. 8, or FIG. 9.

In one embodiment, the network communications interface 1004 coordinate with the network communication module 1007 to complete receiving and transmission of various network signals of the communication apparatus.

The display unit 1003 has a display panel, for example, a liquid crystal display is configured to complete input and display of relevant information.

In addition, functional modules in the embodiments of the present disclosure may be integrated into one processing unit, or each of the modules may exist alone physically, or two or more modules may be integrated into one unit. The integrated unit may be implemented in a form of hardware, or may be implemented in a form of a software functional unit. The functional modules in the embodiments may be located on one terminal or network node, or may be distributed on a plurality of terminals or network nodes.

It should be noted that: when the communication apparatus provided in the foregoing embodiments performs the communication method, only divisions of the foregoing functional modules are described by using an example. During practical application, the foregoing functions may be allocated to and completed by different functional modules according to the requirements, that is, the internal structure of the device is divided into different functional modules, so as to complete all or part of the functions described above. In addition, the communication method provided in the foregoing embodiments belongs to the same concept as the communication apparatus. For a specific implementation process of the communication apparatus, refer to the method embodiments, and details are not described herein again.

The sequence numbers of the foregoing embodiments of the present disclosure are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The above-mentioned storage medium may be a read-only memory, a magnetic disk, an optical disc, or the like.

The above descriptions are merely preferred embodiments of the present disclosure, but not intended to limit the present disclosure. Any modification, equivalent replacement, or improvement made in accordance with the spirit and principle of the present disclosure should fall within the protection scope of the present disclosure.

What is claimed is:

1. A vehicle-based communication method, comprising:
   receiving, by a server from a first communication device corresponding to a first vehicle, second license plate information of a second vehicle and a first device identifier of the first communication device, wherein the first communication device includes a first driving-data recorder and a first shortcut key installed onto the first vehicle, the first shortcut key is reachable by a first driver while driving the first vehicle to reduce likelihood of distraction to the first driver in operating the first shortcut key, and the second license plate information is obtained upon an activation of the first shortcut key by the first driver;
   determining, by the server, a second communication account of a second communication device corresponding to the second vehicle according to the second license plate information of the second vehicle; and
   sending, by the server, the second communication account of the second communication device to the first communication device, the second communication account of the second communication device being used for communicating with the second communication device.

2. The method according to claim 1, wherein: the server includes a driving-data recorder server, the second communication device includes a second driving-data recorder, and the second communication account of the second communication device includes a second device identifier of the second driving-data recorder; and the determining, by the server, the second communication account of the second communication device corresponding to the second vehicle includes:
   when the second license plate information of the second vehicle includes a second license plate image captured by the first driving-data recorder, parsing out, by the driving-data recorder server, a second license plate number of the second vehicle from the second license plate image of the second vehicle, and determining the second device identifier of the second driving-data recorder corresponding to the second license plate number of the second vehicle according to a preset mapping relationship, the preset mapping relationship recording a correspondence between the second license plate number of the second vehicle and the second device identifier of the second driving-data recorder;
   when the second license plate information of the second vehicle includes the second license plate number of the second vehicle, determining, by the driving-data recorder server, the second device identifier of the second driving-data recorder corresponding to the second license plate number of the second vehicle according to the preset mapping relationship; and
   sending, by the driving-data recorder server, the second device identifier of the second driving-data recorder to the first driving-data recorder.

3. The method according to claim 2, before determining, by the server, the second communication account of the second communication device corresponding to the second vehicle according to the second license plate information of the second vehicle, further comprising:
   receiving, by the driving-data recorder server, the second license plate information of the second vehicle and the second device identifier of the second driving-data recorder obtained and sent by the second driving-data recorder;
   when the second license plate information of the second vehicle includes the second license plate image of the second vehicle, parsing out, by the driving-data recorder server, the second license plate number of the second vehicle from the second license plate image, and establishing the preset mapping relationship among the second license plate number of the second vehicle and the second device identifier of the second driving-data recorder; and when the second license plate information of the second vehicle includes the second license plate number of the second vehicle, establishing, by the driving-data recorder server, the preset mapping relationship between the second license plate number of the second vehicle and the second device identifier of the second driving-data recorder.

4. The method according to claim 1, wherein the server includes a social-network server, the first communication device includes a first social-network-client, the second communication device includes a second social-network-client, a first communication account of the first communication device includes a first social-network account, and the second communication account of the second communication device includes a second social-network account and wherein the determining, by the server, the second communication account of the second communication device corresponding to the second vehicle includes:

when the second license plate information of the second vehicle includes a second license plate image of the second vehicle, parsing out, by the social-network server, a second license plate number of the second vehicle from the second license plate image, and determining the second social-network account corresponding to the second license plate number of the second vehicle according to a preset mapping relationship;

when the second license plate information of the second vehicle is includes the second license plate number, determining, by the social-network server, the second social-network account corresponding to the second license plate number of the second vehicle according to the preset mapping relationship, the preset mapping relationship recording a correspondence among the first and second license plate numbers, the first and second social-network accounts, and the first and second device identifiers respectively of the first and second driving-data recorders;

determining, by the social-network server, the first social-network account corresponding to the first device identifier of the first driving-data recorder according to the preset mapping relationship; and sending, by the social-network server, the second social-network account to the first social-network-client on which the first social-network account is logged into.

5. The method according to claim 4, before determining, by the server, the second communication account of the second communication device corresponding to the second vehicle according to the second license plate information of the second vehicle, further comprising:

receiving, by the server, a second device identifier of a second driving-data recorder, the second license plate information of the second vehicle, and the second social-network account obtained and sent by the second communication device corresponding to the second vehicle; and when the second license plate information includes the second license plate image of the second vehicle, parsing out, by the server, the second license plate number of the second vehicle from the second license plate image of the second vehicle, and establishing the preset mapping relationship among the second device identifier of the second driving-data recorder, the second license plate number of the second vehicle, and the second social-network account;

when the second license plate information includes the second license plate number of the second vehicle, establishing, by the server, the preset mapping relationship among the second device identifier of the second driving-data recorder, the second license plate number of the second vehicle, and the second social-network account.

6. The method according to claim 1, wherein the second communication device includes a second driving-data recorder installed onto the second vehicle, and the server includes a driving-data recorder server, the method further comprising:

sending to and receiving from the second driving-data recorder, by the first driving-data recorder, via the driver-data recorder server, a text message.

7. The method according to claim 6, wherein the text message is a pre-recorded message stored in the first or second driving-data recorder.

8. A vehicle-based communication method for a first communication device corresponding to a first vehicle, comprising:

providing the first communication device, wherein the first communication device includes a first driving-data recorder and a first shortcut key installed onto the first vehicle, and the first shortcut key is reachable by a first driver while driving the first vehicle to reduce likelihood of distraction to the first driver in operating the first shortcut key;

obtaining second license plate information of a second vehicle and a first device identifier of the first communication device, wherein the second license plate information is obtained upon an activation of the first shortcut key by the first driver;

sending the second license plate information of the second vehicle and the first device identifier of the first communication device to a server connected to the first communication device, the server being configured to:

determine a second communication account of a second communication device corresponding to the second vehicle according to the second license plate information of the second vehicle, and send the second communication account to the first communication device; and receive the second communication account and communicate with the second communication device according to the second communication account.

9. The method according to claim 8, wherein the server includes a driving-data recorder server, the second communication device includes a second driving-data recorder, and the second communication account of the second communication device includes a second device identifier of the second driving-data recorder.

10. The method according to claim 8, wherein the server includes a social-network server, the first communication device includes a first social-network-client, the second communication device includes a second social-network-client, a communication account of the first communication device includes a first social-network account, and the second communication account of the second communication device includes a second social-network account wherein: the obtaining the second license plate information of the second vehicle and the first device identifier of the first communication device includes:

obtaining, by the first driving-data recorder, the second license plate information of the second vehicle and the first device identifier of the first driving-data recorder;

and wherein the sending the second license plate information of the second vehicle and the first device identifier of the first communication device to the server includes:
sending, by the first driving-data recorder, the second license plate information of the second vehicle and the first device identifier of the first driving-data recorder to the social-network server.

11. The method according to claim 10, further comprising:
receiving, by the first social-network-client, the second social-network account; and
communicating, by the first social-network-client according to the second social-network account, with the second social-network-client on which the second social-network account is logged into.

12. The method according to claim 11, further comprising:
obtaining, by the first communication device, the first device identifier of the first driving-data recorder and the first social-network account logged into on the first social-network-client;
obtaining, by the first communication device, first license plate information of the first vehicle; and
sending, by the first communication device, the first device identifier of the first driving-data recorder, the first license plate information of the first vehicle, and the first social-network account to the server.

13. The method according to claim 8, wherein the second communication device includes a second driving-data recorder installed onto the second vehicle, and the server includes a driving-data recorder server, the method further comprising:
sending to and receiving from the second driving-data recorder, by the first driving-data recorder, via the driver-data recorder server, a text message.

14. The method according to claim 13, wherein the text message is a pre-recorded message stored in the first or second driving-data recorder.

15. A server for vehicle-based communication, comprising: a memory; and a processor coupled to the memory and configured to perform:
receiving, from a first communication device corresponding to a first vehicle, second license plate information of a second vehicle and a first device identifier of the first communication device, wherein the first communication device includes a first driving-data recorder and a first shortcut key installed onto the first vehicle, the first shortcut key is reachable by a first driver while driving the first vehicle to reduce likelihood of distraction to the first driver in operating the first shortcut key, and the second license plate information is obtained upon an activation of the first shortcut key by the first driver;
determining a second communication account of a second communication device corresponding to the second vehicle according to the second license plate information of the second vehicle; and
sending the second communication account of the second communication device to the first communication device, the second communication account of the second communication device being used for communicating with the second communication device.

16. The server according to claim 15, wherein: the server includes a driving-data recorder server, the second communication device includes a second driving-data recorder, and the second communication account of the second communication device includes a second device identifier of the second driving-data recorder; and the determining the communication account of the second communication device corresponding to the second vehicle includes:
when the second license plate information of the second vehicle includes a second license plate image captured by the first driving-data recorder, parsing out a second license plate number of the second vehicle from the second license plate image of the second vehicle, and determining the second device identifier of the second driving-data recorder corresponding to the second license plate number of the second vehicle according to a preset mapping relationship, the preset mapping relationship recording a correspondence between the second license plate number of the second vehicle and the second device identifier of the second driving-data recorder;
when the second license plate information of the second vehicle includes the second license plate number of the second vehicle, determining the second device identifier of the second driving-data recorder corresponding to the second license plate number of the second vehicle according to the preset mapping relationship; and
sending the second device identifier of the second driving-data recorder to the first driving-data recorder.

17. The server according to claim 16, before determining the second communication account of the second communication device corresponding to the second vehicle according to the second license plate information of the second vehicle, the processor is further configured to perform:
receiving the second license plate information of the second vehicle and the second device identifier of the second driving-data recorder obtained and sent by the second driving-data recorder;
when the second license plate information of the second vehicle includes the second license plate image of the second vehicle, parsing out the second license plate number of the second vehicle from the second license plate image, and establishing the preset mapping relationship between the second license plate number of the second vehicle and the second device identifier of the second driving-data recorder; and
when the second license plate information of the second vehicle includes the second license plate number of the second vehicle, establishing the preset mapping relationship between the second license plate number of the second vehicle and the second device identifier of the second driving-data recorder.

18. The server according to claim 15, wherein the server includes a social-network server, the first communication device includes a first social-network-client, the second communication device includes a second social-network-client, a first communication account of the first communication device includes a first social-network account, and the second communication account of the second communication device includes a second social-network account and wherein the determining second communication account of second second communication device corresponding to the second vehicle includes:
when the second license plate information of the second vehicle includes a second license plate image of the second vehicle captured by the first driving-data recorder, parsing out a second license plate number of the second vehicle from the second license plate image, and determining the second social-network account corresponding to the second license plate number of the second vehicle according to a preset mapping relationship;

when the second license plate information of the second vehicle the second license plate number parsed out by the first driving-data recorder, determining the second social-network account corresponding to the second license plate number of the second vehicle according to a preset mapping relationship, the preset mapping relationship recording a correspondence among first and second license plate numbers, first and second social-network accounts, and first and second device identifiers respectively of first and second driving-data recorders;

determining the first social-network account corresponding to the first device identifier of the first driving-data recorder according to the preset mapping relationship; and sending the second social-network account to the first social-network-client on which the first social-network account is logged into.

19. The server according to claim 18, before determining second communication account of the second communication device corresponding to the second vehicle according to the second license plate information of the second vehicle, the processor is further configured to perform:

receiving a second device identifier of a second driving-data recorder, the second license plate information of the second vehicle, and the second social-network account obtained and sent by the second communication device corresponding to the second vehicle; and when the second license plate information includes the second license plate image of the second vehicle, parsing out the second license plate number of the second vehicle from the second license plate image of the second vehicle, and establishing the preset mapping relationship among the second device identifier of the second driving-data recorder, the second license plate number of the second vehicle, and the second social-network account;

when the license plate information includes the second license plate number of the second vehicle, establishing the preset mapping relationship among the second device identifier of the second driving-data recorder, the second license plate number of the second vehicle, and the second social-network account.

20. The server according to claim 15, wherein the second communication device includes a second driving-data recorder installed onto the second vehicle, and the server includes a driving-data recorder server, the method further comprising:

sending to and receiving from the second driving-data recorder, by the first driving-data recorder, via the driver-data recorder server, a text message.

* * * * *